United States Patent Office 3,088,912
Patented May 7, 1963

---

3,088,912
LUBRICATING COMPOSITION
Arnold J. Morway, Clark, and Alfred H. Matuszak, Westfield, N.J., assignors to Esso Research and Engineering Company, a corporation of Delaware
No Drawing. Filed Mar. 1, 1960, Ser. No. 12,007
7 Claims. (Cl. 252—49.7)

This invention relates to lubricating compositions. Particularly, it relates to lubricating fluids and greases comprising alkyl-aryl silane as a base oil, and alkaline earth metal salt of $C_2$ to $C_4$ fatty acid in combination with alkaline earth metal salt of $C_7$ to $C_{30}$ fatty acid, wherein the mole ratio of the low molecular weight fatty acid to the higher molecular weight fatty acid is 4:1 or greater.

Recently, lubricating grease compositions thickened with alkaline earth metal salts (usually calcium) of low molecular weight fatty acid in combination with calcium salts of higher molecular weight fatty acids have found wide spread use in commercial applications. These mixed salt lubricants have good anti-wear and load-carrying ability, which properties have made them commercially successful. The commercial mixed salt greases have been prepared using a mineral oil base. However for high temperature use, i.e. temperatures above 400° F., such as are encountered in lubrication of aircraft, rocket engines, steel making facilities, etc., the mineral base oil compositions do not give good results because of the volatility of mineral oil. In attempts to use base oils which are better adapted for higher temperatures, namely polysilicone fluids, it was found that the resulting grease structures were inferior due to poor dispersion and poor compatibility of the mixed salt thickener with the silicone fluids. In order to overcome this disadvantage, it was found necessary to prepare such silicone greases by first making the mixed salt material as a concentrate in either a mineral oil or a diester oil, and then incorporating silicone fluid to form the finished grease. This method is not entirely satisfactory because the presence of said mineral or diester oil degrades the lubricant for high temperature use. It has now been found that instead of using a silicone oil, that an alkyl-aryl silane can be readily thickened to a solid lubricating grease structure with the mixed salts by forming said salts in situ. The resulting grease structure gives good anti-wear, is suitable for use at high temperatures and avoids the high rates of wear encountered when using silicones in high speed applications. However, if desired, in high temperature applications involving low pressures and slow sliding speeds, the silane lubricant material may be diluted with minor amounts of a silicone fluid. By this latter method, excellent grease structures are obtained in the silane and an economical advantage is obtained because of the lower cost of silicone oil as compared to the silane oil. At the same time, the high wear imparting properties of the silicone fluid is materially removed.

The silanes of the invention can be represented by the general formulae:

wherein R represents a $C_6$ to $C_{20}$ alkyl group, preferably a $C_8$ to $C_{16}$ alkyl group; R' represents an aryl group such as phenyl, naphthyl, bi-phenyl or $C_1$ to $C_6$ substituted aryl groups; and R" represents either R or R'. Examples of such oils include heptyl triphenyl silane; diheptyl, diphenyl silane; triheptyl phenyl silane; dinonyl dinaphthyl silane; etc. A specific silane that was used in the working examples of the invention is commercially available as Dow Corning QF–6–7009 Fluid. This material is a dilauryl, diphenyl silane and has the following characteristics:

| | |
|---|---|
| Color | Clear, straw |
| Viscosity, centistokes at: | |
| 0° F. | 1500 |
| 77° F. | 70 |
| 100° F. | 38 |
| 210° F. | 6.3 |
| 400° F. | 1.7 |
| 700° F. | 0.65 |
| V.I. (100–210° F.) | 125 |
| Specific gravity (77° F.) | 0.90 |
| Freeze point, ° F. | –30 |
| Flash point, ° F. | 500 |
| 4-ball wear test, mm. scar diam. (1800 r.p.m.—10 kg.—75° C.—1 hour) mm | 0.40 |

The lubricating compositions of the invention comprise a major amount of the lubricating base oil and about 5 to 40, e.g. 10 to 30 wt. percent of the mixed salt-thickener. This thickener in turn, comprises a mixture of the alkaline earth metal salts of a low molecular weight $C_2$ to $C_4$ fatty acid (preferably acetic acid or acetic anhydride) and $C_7$ to $C_{30}$ fatty acids. Usually about 4 to 20, preferably 4 to 13 moles of low molecular weight acid, e.g. acetic acid, per mole of $C_7$ to $C_{30}$ fatty acid will be used. The $C_7$ to $C_{30}$ fatty acid will preferably comprise a mixture of about 0.1 to 3.0 molar proportions of a $C_{14}$ to $C_{30}$ fatty acid or hydroxy fatty acid, such as 12-hydroxy stearic acid, per molar proportion of a $C_7$ to $C_{12}$ fatty acid.

The mixed salt thickener is best prepared by reacting alkaline earth metal base, such as the hydroxides or carbonates of calcium, barium, strontium or magnesium, with the mixture of fatty acids. Calcium is the preferred metal, being generally used in the form of a lime slurry. While acetic acid is usually used as the low molecular weight acid, its anhydride may be used instead.

The intermediate molecular weight fatty acids, i.e. the $C_7$ to $C_{12}$ acids, will include those straight chain, saturated acids such as capric, caprylic, pelargonic acid, lauric acid, etc.

As mentioned above, $C_{14}$ to $C_{30}$ fatty acids may also be used, such as stearic, 12-hydroxy stearic, oleic, tallow acids, hydrogenated fish oil acids, etc., or the corresponding glycerides.

If desired, various inorganic acids may be used to replace part of the low molecular weight fatty acid component in the preparation of the thickener. Thus, strong mineral acids such as hydrochloric acid, nitric acid, sulfuric acid, orthophosphoric acid and spent acids from sulfonation processes may also be incorporated. Also, dithiodialkyl phosphoric acids wherein the alkyl groups contain 3 to 10 carbon atoms can be used to advantage. An especially preferred inorganic acid is orthophosphoric acid, which is economical, and less corrosive to the manufacturing equipment than acetic acid. Furthermore, by using the phosphoric acid to replace a portion of the low molecular weight fatty acid, the resulting grease is made more resistant to color and oxidation degration than if no phosphoric acid was used. Various inorganic salts such as alkaline earth metal or alkali metal (e.g. sodium and lithium) nitrites, phosphates, chromates, and carbonates may be added to the lubricant.

The base oil is preferably 100% silane, but suitable base oils include mixtures of 55 to 90 wt. percent silane and 10 to 45 wt. percent silicone oil.

The silicone polymers which can be used in conjunction with the silanes are silicone oils having viscosities of about 1 to 500 centistokes at 25° C. These oils have the general formula:

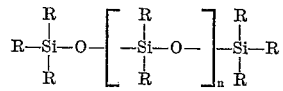

wherein R represents halogen substituted (e.g. chlorine) or unsubstituted hydrocarbon radicals including alkyl, aryl, haloaryl, alkylaryl, aralkyl and cycloalkyl radicals containing between about 1 to 8 carbon atoms per radical, and $n$ is an integer whose average value depends upon the viscosity of the oil. Specific examples of such oils include phenyl-methylsilicone, dimethylsilicone and chlorophenylmethylsilicone. Silicone oils are well known in the art and are commercially available under trade names such as DC (Dow Corning) F-258 Silicone Fluid, DC-200 Silicone Fluids of 1 to 50 cs., DC F-60 Silicone Fluid, DC-510 Silicone Fluid DC-550 Silicone Fluid, DC-555 Silicone Fluid and DC-710 Silicone Fluid. One preferred silicone oil is DC-550 Silicone Fluid which is predominantly a phenylmethylsilicone polymer oil having a viscosity at 25° C. of 100-150 centistokes.

Various other additives may also be added to the lubricating composition (e.g. 0.1 to 10.0 weight percent based on the total weight of the composition). Such additives include oxidation inhibitors such as phenyl-alpha-naphthylamine, phenothiazine and dioctyldiphenylamine; corrosion inhibitors such as sodium nitrite and sorbitan monooleate; supplemental grease thickeners such as polyethylene and polypropylene; stabilizers such as aluminum hydroxy stearate, and the like.

The compositions of the invention may be prepared in several ways. In one method, all the acids are dispersed in the base oil and neutralized with the metal base. The water of reaction may be left in the lubricant by not applying heat to thereby form a "cold-sett" lubricant. However, generally the product will be heated to about 225° to 600° F. to dehydrate the mixture. If dehydrated at 225° F. to 400° F. the resulting composition will be less thicker than if higher dehydration temperatures are used. This relatively low temperature dehydration technique is advantageously used in making semi-fluid or soft greases. If the same composition is heated above 400° F., say about 430° to 600° F., a pronounced thickening effect occurs. This high temperature technique is used to advantage when a more solid or a harder product is desired.

Still another technique forms a solid or harder grease but avoids the high temperatures. This last technique involves partially neutralizing the acids dispersed in oil, i.e. neutralizing only 90 to 98% of the available acidity, heating at 300° to 350° F. for 1 to 8 hours, until the acidity further decreases to about 0.5 to 5.0% (calculated as oleic acid) of the original available acidity, and then adding more metal base sufficient to attain a slight degree of alkalinity.

In each of the above cases involving heating, the mixture may then be next cooled to about 200° to 210° F., where conventional additives, if any, may be added. The grease is then preferably cooled to below 150° F. where it may be homogenized, as by passing through a Gaulin homogenizer or a Charlotte mill, followed by subsequent cooling to room temperature. If desired, grease concentrates can be made by the above techniques and then diluted with additional lubricating oil to form the final grease composition or even further diluted to form a fluid type lubricant.

The invention will be further understood by the following examples, wherein all parts are by weight.

EXAMPLE I 71.5 parts of Dow Corning QF-6-7009 Fluid (dilauryl, diphenyl silane), 9.5 parts of hydrated lime and 2 parts of Hydrofol Acid Code 200 were added to an electrically heated grease kettle and intimately mixed. The Hydrofol Acid Code 200 is a commercial hydroxy stearic acid obtained by hydrogenating castor oil and consists of about 88 wt. percent 12-hydroxy stearic acid and 12 wt. percent of stearic acid. Next, a blend consisting of 12 parts of glacial acetic acid and 4 parts of Wecoline AAC acid was added to the kettle. Wecoline AAC acid is a commercial acid derived from coconut oil and consisting of about 26 wt. percent lauric acid, about 28 wt. percent caprylic acid and about 46 wt. percent capric acid. External heating was then initiated and the temperature of the mixture was raised to about 430° F. and maintained at this temperature for about ½ hour. The heat was then shut off and the material was cooled to 200° F., at which point one part of phenyl-alpha-naphthylamine was added as an oxidation inhibitor. Following this, the mixture was allowed to cool to 100° F. and was then pumped through a Morehouse mill having a 0.003" clearance.

EXAMPLE II 35.75 parts of Dow Corning QF-6-7009 Fluid and 4.75 parts of hydrated lime were charged to an electrically heated kettle and intimately mixed to a smooth uniform slurry. To this slurry was added 1 part of Hydrofol Acid Code 200 and the temperature raised to 110° F. A blend consisting of 6 parts of glacial acetic acid and 2 parts of Wecoline AAC acid was then added while stirring and the kettle temperature was increased to 400° F. Heating was discontinued and the grease was allowed to cool to 200° F. at which point 0.5 part of phenyl-alpha-naphthylamine was mixed into the product. The composition was then further cooled to 100° F. where it was homogenized by passing through a Morehouse mill having a clearance of 0.003". To this product was added 50 parts by weight of a polysilicone available under the trade name of Dow Corning Fluid 550. This polysilicone is a methyl-phenyl polysilicone having a viscosity of about 100-150 centistokes at 25° C., exceptionally good heat stability, and a relatively flat viscosity-temperature slope.

EXAMPLE III

A grease was prepared as follows:

41.46 parts of the silane described in Example II, and 8.4 parts of hydrated lime were charged to the electrically heated kettle and intimately mixed to a smooth uniform slurry. To this slurry was added 1.8 parts of Hydrofol Acid Code 200. Next, a blend consisting of 10.67 parts by weight of glacial acetic acid and 3.67 parts by weight of Wecoline AAC acid was added and the mixture was heated to 400° F. 33.33 parts of Dow Corning Fluid 550 polysilicone was added and the grease was next rapidly cooled to 200° F. by transferring to a jacketed kettle and passing cooling water through the kettle jacket. 0.67 part of phenothiazine was added as an oxidation inhibitor and the grease was further cooled to 150° F. where it was milled and cooled by passing through a chilled three roller mill having 0.003" clearance between rollers.

The compositions tested and the results obtained are summarized in Table I which follows. For comparison purposes data is also included on a mixed salt commercial type lubricant using a mineral oil base.

Table I

| Components (Parts by Weight): | Examples | | | |
|---|---|---|---|---|
| | I | II | III | ---- |
| Glacial Acetic Acid | 12.0 | 6.00 | 10.67 | 12.0 |
| Wecoline AAC Acids | 4.0 | 2.00 | 3.67 | 3.0 |
| Hydrofol Acid Code 200 | 2.0 | 1.00 | 1.80 | 3.0 |
| Hydrated Lime | 9.5 | 4.75 | 8.40 | 9.5 |
| Phenyl α-Naphthylamine | 1.0 | 0.50 | | 1.0 |
| Phenothiazine | | | 0.67 | |
| Dow Corning Silane QF-6-7009 | 71.5 | 37.75 | 33.33 | |
| DC Fluid 550 | | 50.00 | 41.46 | |
| Mineral Lubricating Oil, 55 SUS at 210° F | | | | 71.5 |
| Mole Ratio Acetic/Wecoline+Hydrofol | 6.9/1.0 | 6.9/1.0 | 6.7/1.0 | 7.7/1.0 |
| Mole Ratio Hydrofol/Wecoline | 0.25/1.0 | 0.25/1.0 | 0.24/1.0 | 0.5/1.0 |
| Properties: | | | | |
| Appearance | Excellent smooth grease. | Excellent smooth grease. | Excellent smooth grease. | Excellent smooth grease. |
| Dropping Point, °F | 500+ | 500+ | 500+ | 500+. |
| Penetration, 77° F., mm./10— | | | | |
| Unworked | 265 | 350 | 285 | 295. |
| Worked 60 strokes | 265 | 355 | 285 | 315. |
| Worked 10,000 strokes | 298 | 362 | 292 | 330. |
| 4-Ball Wear Scar, mm. (1,800 r.p.m., 10 kg. Load, 75° C., 1 hour) | 0.30 | 0.42 | 0.49 | 0.30. |
| Water Solubility | Insoluble | | | Insoluble. |
| Almen Test (Wgts. carried)— | | | | |
| Gradual Loading | 15 | | | 15. |
| Pin Condition | Excellent | | | Excellent. |
| Lubrication Life,[1] Hrs.— | | | | |
| 250° F., 10,000 r.p.m | 2,000+ | 2,000+ | 2,000+ | 2,000+. |
| 300° F., 10,000 r.p.m | 1,920 | 1,400 | 1,200 | 600. |
| 350° F., 10,000 r.p.m | 1,479 | 1,200 | 900 | |

[1] AFBMA-NLGI Spindle Test.

As seen by the preceding table, the greases of Examples I to III were all excellent greases. It is to be noted that the wear was lowest for the grease of Example I which contained the greatest amount of silane, while the greases of Examples II and III which also contained polysilicone oil showed greater wear. The advantage of the silane greases over a similar mineral oil grease is illustrated by the Lubrication Life data. This test is the standard spindle test of the Anti-Friction Bearing Manufacturers Association - National Lubricating Grease Institute (AFBMA-NLGI). The test is carried out by determining the lubricating life of the grease in hours in a ball bearing rotating at 10,000 revolutions per minute. When the test was made at a bearing temperature of 250° F., it is seen that the three silane containing greases gave the same results as the mineral oil grease, i.e. over 2,000 hours life. At a test temperature of 300° F., the silane greases ranged from 1,200 to 1,920 hours, depending upon the amount of silane and thickener present. On the other hand, the mineral oil grease had a life of only 600 hours. This difference in lubricating life is further emphasized when it is seen that the grease of Example I (which represents the closest comparison to the mineral oil grease in amount of thickener) had a life of 1,920 hours at 300° F., and a life of 1,479 hours at 350° F. as compared to the 600 hour life at 300° F. of the mineral oil grease.

It was further found that a mixture of silane and silicone gave lower wear than either oil alone. Thus, the silane of the examples (DC-QF-6-700Q) gave a scar diameter of 0.40 mm. in the 4-ball wear test, while the DC-550 Silicone Fluid gave a wear scar of 0.69 mm. Yet, a 50/50 mixture by weight of these two oils gave a wear scar of 0.32 mm. This effect is not evident in the greases of the examples since the alkaline earth metal mixed salt thickener acts as an anti-wear agent and masks the effect of the oil. However, this synergistic effect as to the anti-wear properties of the silane-silicone blend is believed to have been also present in the grease compositions.

What is claimed is:

1. A lubricating composition comprising a major amount of a silane oil of the general formulae:

wherein R represents a $C_6$ to $C_{20}$ alkyl group, R' represents an aryl group and R" represents a member selected from the group consisting of R and R', and a grease thickening amount within the range of about 5 to 40 wt. percent of alkaline earth metal mixed salts of a $C_2$ to $C_4$ fatty acid and $C_7$ to $C_{30}$ fatty acid in a molar ratio of 4 to 20 moles of $C_2$ to $C_4$ fatty acid per molar proportion of $C_7$ to $C_{30}$ fatty acid.

2. A lubricating composition according to claim 1 which also contains about 10 to 45 wt. percent of a polysilicone oil.

3. A lubricating composition according to claim 1, wherein said alkaline earth metal is calcium.

4. A lubricating composition according to claim 1, wherein said $C_7$ to $C_{30}$ fatty acid is a mixture of $C_7$ to $C_{12}$ acid with $C_{14}$ to $C_{30}$ fatty acid in a molar proportion of about 0.1 to 3.0 molar proportions of $C_{14}$ to $C_{30}$ acid per molar proportion of $C_7$ to $C_{12}$ fatty acid.

5. A lubricating grease composition comprising a major amount of a silane oil of the general formulae:

wherein R represents a $C_8$ to $C_{14}$ alkyl group, R' represents an aryl group and R" represents a member selected from the group consisting of R and R', and a grease thickening amount within the range of about 10 to 30 wt. percent of calcium mixed salts of acetic acid, $C_7$ to $C_{12}$ fatty acid and said $C_{14}$ to $C_{30}$ fatty acid, in a molar proportion of about 4 to 13 moles of acetic acid per total mole of said $C_7$ to $C_{12}$ acid and $C_{14}$ to $C_{30}$ fatty acid, and wherein there is about 0.1 to 3.0 molar proportions of $C_{14}$ to $C_{30}$ fatty acid per molar proportion of $C_7$ to $C_{12}$ fatty acid.

6. A lubricating grease composition according to claim 5, wherein said acetic acid is supplied in the form of acetic anhydride and wherein $C_{14}$ to $C_{30}$ fatty acid is 12-hydroxy stearic acid.

7. A lubricating grease composition according to claim 6, wherein said silane is dilauryl diphenyl silane.

References Cited in the file of this patent

UNITED STATES PATENTS

| | | |
|---|---|---|
| 2,129,281 | Lincoln et al. | Sept. 6, 1938 |
| 2,846,392 | Morway et al. | Aug. 5, 1958 |
| 2,947,772 | Eynon et al. | Aug. 2, 1960 |
| 3,020,300 | Schnabel | Feb. 6, 1962 |